United States Patent
Ono

(10) Patent No.: US 9,479,658 B2
(45) Date of Patent: *Oct. 25, 2016

(54) IMAGE FORMING APPARATUS INTERFACE WHERE USER SELECTIONS ARE DISPLAYED IN A HIERARCHICAL MANNER

(71) Applicant: BROTHER KOGYO KABUSHIKI KAISHA, Nagoya-shi, Aichi-ken (JP)

(72) Inventor: Takatoshi Ono, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/859,787

(22) Filed: Sep. 21, 2015

(65) Prior Publication Data

US 2016/0014288 A1    Jan. 14, 2016

Related U.S. Application Data

(63) Continuation of application No. 14/329,351, filed on Jul. 11, 2014, now Pat. No. 9,172,830, which is a continuation of application No. 13/617,190, filed on Sep. 14, 2012, now Pat. No. 8,817,284.

(30) Foreign Application Priority Data

Oct. 24, 2011    (JP) .................................. 2011-232568

(51) Int. Cl.
*H04N 1/00*    (2006.01)
*G03G 15/00*    (2006.01)

(52) U.S. Cl.
CPC ........ *H04N 1/00474* (2013.01); *G03G 15/502* (2013.01); *H04N 1/00408* (2013.01);
(Continued)

(58) Field of Classification Search
CPC .................... H04N 1/00408; H04N 1/00482; H04N 1/00411; H04N 1/00424; H04N 1/00474; G03G 15/502
USPC .............................. 345/173; 358/1.9; 399/81
See application file for complete search history.

(56) References Cited

U.S. PATENT DOCUMENTS 7,068,385 B2    6/2006    Kohli
8,006,198 B2    8/2011    Okuma et al.
(Continued)

FOREIGN PATENT DOCUMENTS

JP    2004-342045 A    12/2004
JP    2009-260903 A    11/2009

OTHER PUBLICATIONS

U.S. Official Action dated Dec. 19, 2013 from related U.S. Appl. No. 13/617,190.
(Continued)

*Primary Examiner* — Eric A Rust
(74) *Attorney, Agent, or Firm* — Scully, Scott, Murphy & Presser, P.C.

(57) ABSTRACT

An image forming apparatus, including: a display device; a coordinate detecting portion which detects a directed coordinate in a display area including a first area in which is displayed a hierarchy image including uppermost-level images and lower-level images; a first display control section; a second display control section to display at least one first button image; and a third display control section, the uppermost-level images including: a first image in which is displayed at least one second button image; a second image in which is displayed at least one third button image; and a third image, wherein, where the directed coordinate is one of coordinates corresponding to the first through third button images, the third control section displays a lower-level image corresponding to a button image corresponding to the directed coordinate, and wherein the first control section executes processing to display the one uppermost-level image so as to be changed.

22 Claims, 10 Drawing Sheets

(52) U.S. Cl.
CPC ...... *H04N1/00411* (2013.01); *H04N 1/00424* (2013.01); *H04N 1/00435* (2013.01); *H04N 1/00477* (2013.01); *H04N 1/00482* (2013.01); *H04N 2201/0039* (2013.01); *H04N 2201/0094* (2013.01)

(56) References Cited

U.S. PATENT DOCUMENTS

| | | |
|---|---|---|
| 2005/0007616 A1 | 1/2005 | Sugiyama et al. |
| 2007/0113199 A1 | 5/2007 | Lausterer et al. |
| 2009/0237699 A1 | 9/2009 | Umezawa |
| 2010/0245259 A1 | 9/2010 | Bairagi et al. |
| 2011/0096348 A1 | 4/2011 | Ebi |
| 2013/0077119 A1 | 3/2013 | Arai |

OTHER PUBLICATIONS

U.S. Notice of Allowance dated Apr. 15, 2014 from related U.S. Appl. No. 13/617,190.

Apple, Inc., "iPhone User Guide for iOS 4.2 and 4.3 Software", 2011, pp. 1-274, http://manuals.info.apple.com/MANUALS/1000/MA1539/en_US/iPhone_iOS4_User_Guide.pdf.

Apple, Inc., "iPad User Guide for iOS 4.2 Software", 2010, pp. 1-181, http://manuals.info.apple.com/MANUALS/1000/MA1561/en_US/iPad_iOS4_User_Guide.pdf.

Notification of Reasons for Refusal dated Jun. 23, 2015 received in related application JP 2011-232568 together with an English language translation.

U.S. Official Action dated Mar. 4, 2015 from related U.S. Appl. No. 14/329,351.

U.S. Notice of Allowance dated Oct. 9, 2014 from related U.S. Appl. No. 14/329,351.

U.S. Notice of Allowance dated Jun. 22, 2015 from related U.S. Appl. No. 14/329,351.

U.S. Corrected Notice of Allowability dated Aug. 27, 2015 from related U.S. Appl. No. 14/329,351.

Japanese Official Action dated Jan. 12, 2016 received in related application JP 2011-232568 together with an English language translation.

Fuyuhiko, I., "Technique for efficient use of iPhone 07 home screen", iPhonePeople Autumn-Winter, Japan, Askey-Mediaworks Inc., Oct. 29, 2010, pp. 025-029 together with a partial English language translation.

IMAGE FORMING APPARATUS INTERFACE WHERE USER SELECTIONS ARE DISPLAYED IN A HIERARCHICAL MANNER

CROSS REFERENCE TO RELATED APPLICATION

The present application is a continuation of and claims the benefit of pending U.S. application Ser. No. 14/329,351 filed Jul. 11, 2014 which is a continuation of U.S. application Ser. No.: 13/617,190 filed on Sep. 14, 2012 (now U.S. Pat. No. 8,817,284, granted Aug. 26, 2014) which is based on Japanese Patent Application No. 2011-232568 filed on Oct. 24, 2011. The contents of each of the above documents are hereby incorporated by reference in their entirety.

BACKGROUND

1. Field of the Invention

The present invention relates to an image forming apparatus configured to form various images, a method of controlling the image forming apparatus, and a storage medium storing program for the image forming apparatus.

2. Description of Related Art

As a technique for displaying a plenty of information on one operation screen, a menu is displayed in a hierarchical structure, for instance. When a button image in a display screen at a certain level of the hierarchical structure is selected, the display screen that is being currently displayed is changed to a display screen at a level next to the above-indicated certain level. In the display screen at the next level, a plurality of different button images are displayed.

SUMMARY

In a composite machine having multiple functions such as a scanning function, a printing function, a copying function, and a facsimile function, a technique of permitting setting of many functions to be displayed utilizing a deeper hierarchical structure having multiple hierarchical levels tends to increase the number of operations required for displaying, on a display screen, a function that a user desires to select. It is accordingly difficult for the user to find out how to make access to a desired function and which function to be used. Therefore, such a technique does not ensure the user of operating ease. It is therefore an object of the invention to provide a technique which eliminates such inconvenience.

The above-indicated object may be achieved according to a principle of the present invention, which provides an image forming apparatus, comprising: a display device configured to display various images; and a coordinate detecting portion configured to detect a directed coordinate in a display area of the display device, the image forming apparatus configured to execute processing based on the directed coordinate detected by the coordinate detecting portion,
  wherein there are defined, in the display area of the display device, a first area in which a hierarchy image is displayed and a second area, the hierarchy image having a hierarchical structure and including: a plurality of uppermost-level images each of which is an uppermost level in the hierarchical structure and which are images for displaying respective different information; and lower-level images each of which is a lower level in the hierarchical structure lower than the uppermost-level images and each of which is an image for displaying at least one of: (a) information for setting parameters for utilizing a function of the image forming apparatus; and (b) information for executing the function of the image forming apparatus according to the parameters,
  wherein the image forming apparatus further comprises: a first display control section configured to control the display device to display one of the plurality of uppermost-level images in the first area; a second display control section configured to control the display device to display, in the second area, at least one first button image by which is displayed a lower-level image corresponding to a certain function among functions of the image forming apparatus; and a third display control section configured to control the display device to display a lower-level image,
  wherein the plurality of uppermost-level images include:
    a first uppermost-level image in which is displayed at least one second button image by which is displayed a lower-level image corresponding to a function of the image forming apparatus different from the function to which the lower-level image to be displayed by the first button image corresponds;
    a second uppermost-level image in which is displayed at least one third button image by which is displayed a lower-level image corresponding to a function to be executed according to parameters which are set according to at least one of: the lower-level image to be displayed by the first button image; and the lower-level image to be displayed by the second button image; and
    a third uppermost-level image in which is displayed various contents information,
  wherein, where the directed coordinate detected by the coordinate detecting portion is any one of a coordinate corresponding to the first button image, a coordinate corresponding to the second button image, and a coordinate corresponding to the third button image, the third display control section controls the display device to display a lower-level image corresponding to a button image corresponding to the directed coordinate detected by the coordinate detecting portion, and
  wherein the first display control section is configured to execute processing to display, in the first area, the one of the plurality of uppermost-level images such that the one of the plurality of uppermost-level images is changed.

BRIEF DESCRIPTION OF THE DRAWINGS

The above and other objects, features, advantages and technical and industrial significance of the present invention will be better understood by reading the following detailed description of embodiments of the invention, when considered in connection with the accompanying drawings, in which.

DETAILED DESCRIPTION OF THE EMBODIMENTS

Embodiment

Figure 1:
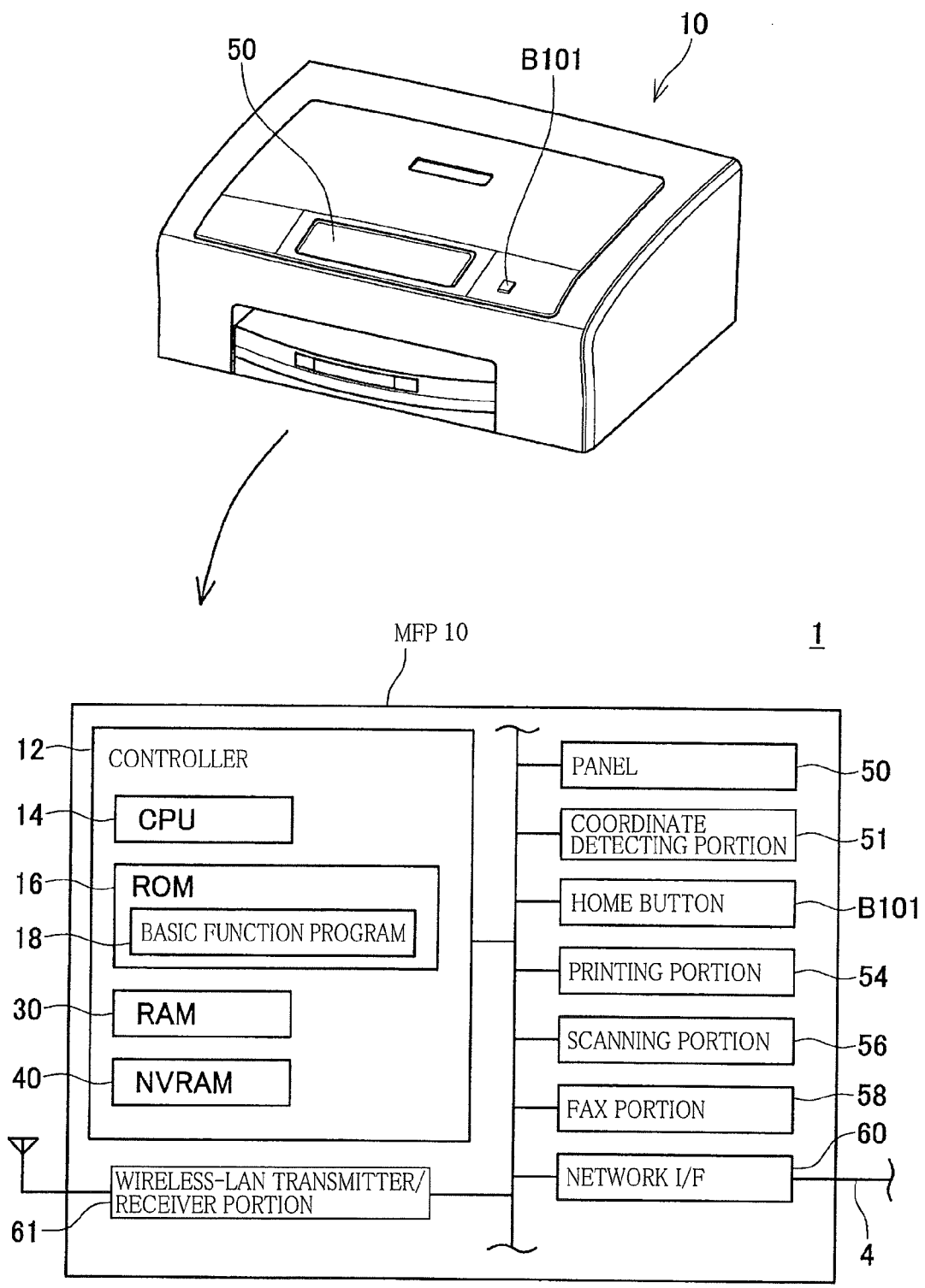
FIG. 1 is an external view and a functional block diagram of a Multifunction Peripheral (MFP) according to one embodiment of the invention.

FIG. 1 is a block diagram of a Multifunction Peripheral (hereinafter referred to as the "MFP") 10 according to one embodiment of the present invention.

<Structure of MFP 10>

The MFP 10 as an image forming apparatus is an apparatus having a printing function, a scanning function, a copying function, a facsimile function, a telephone function, etc. The MFP 10 includes a controller 12, a panel 50 as a display device, a coordinate detecting portion 51, a printing portion 54, a scanning portion 56, a FAX portion 58, a network interface 60, a wireless-LAN transmitter/receiver portion 61, a home button B101, etc. The controller 12 includes a CPU 14, a ROM 16, a RAM 30, an NVRAM (Non Volatile RAM) 40, etc.

The CPU 14 executes various processing according to programs stored in the ROM 16. The processing executed by the CPU 14 will be later explained in detail. The ROM 16 stores a basic function program 18 for controlling basic operations of the MFP 10.

The RAM 30 is a volatile memory and is a storage area for storing various data formed in execution of the processing according to the basic function program 18. Examples of the data to be stored include a type of display standby screen. The type of display standby screen is data that functions as a pointer for pointing which one of a plurality of uppermost-level images is displayed in a first area A1.

In the NVRAM 40, various parameters are stored. Examples of the stored parameters include parameters relating to home-button setting, wallpaper-image setting. The home-button setting is for setting which one of a plurality of uppermost-level images (a function display image P1, a shortcut image P2, and a home image P3) is displayed in the first area A1 when the home button B101 is touched. The wallpaper-image setting is setting as to an image (the so-called wallpaper image) to be attached to a background of the first area A1 in each of the first uppermost-level image through the third uppermost-level image. These parameters may be set by a user in advance.

The printing portion 54 is a portion to perform printing. The scanning portion 56 is a portion to read a document and create data based on the read document. The FAX portion 58 is a portion to transmit and receive document data. The network interface 60 is connected to a wired LAN 4 and is a portion to transmit and receive various data. The wireless-LAN transmitter/receiver portion 61 is a portion to execute various communication with access points (not shown) by wireless LAN communication.

As shown in FIG. 1, on an upper surface of the MFP 10 on its front side, the panel 50 and the home button B101 are provided. The panel 50 has a function of displaying various images. The panel 50 has, on its surface, the coordinate detecting portion 51 having a transparent flat layer so as to cover the panel 50. The coordinate detecting portion 51 has a function of detecting a coordinate which is directed by touching or approaching of a user's finger or a stylus (which is a pen for a touch panel). (The coordinate is hereinafter referred to as the "directed coordinate" where appropriate.) The panel 50 and the coordinate detecting portion 51 function as the so-called touch panel. The home button B101 is provided outside a display area of the panel 50. The home button B101 may be a capacitive touch button.

Figure 7:
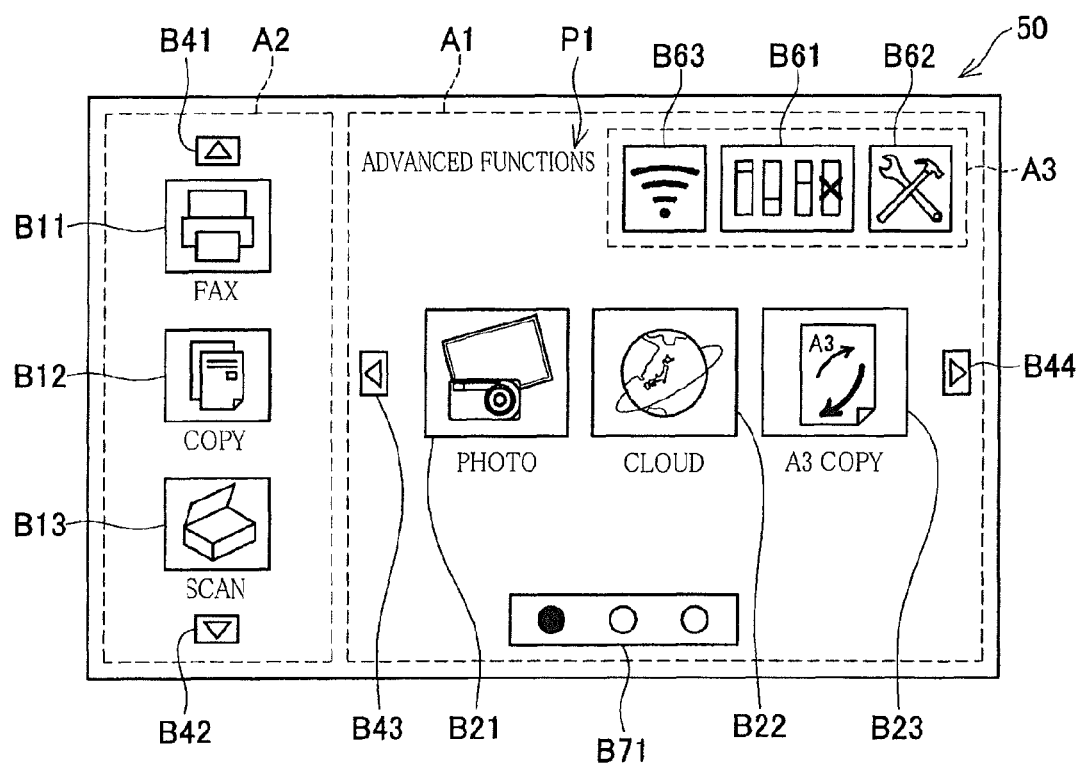
FIG. 7 is a display example (I) of a panel.
Figure 8:
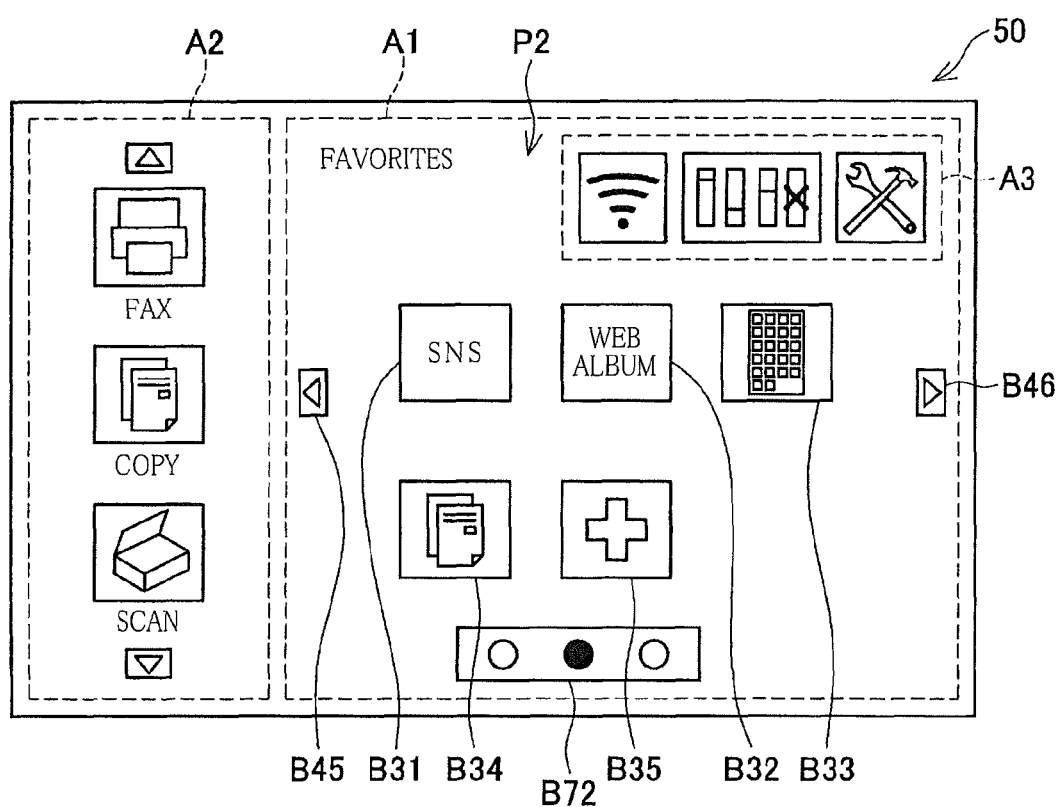
FIG. 8 is a display example (II) of the panel.
Figure 9:
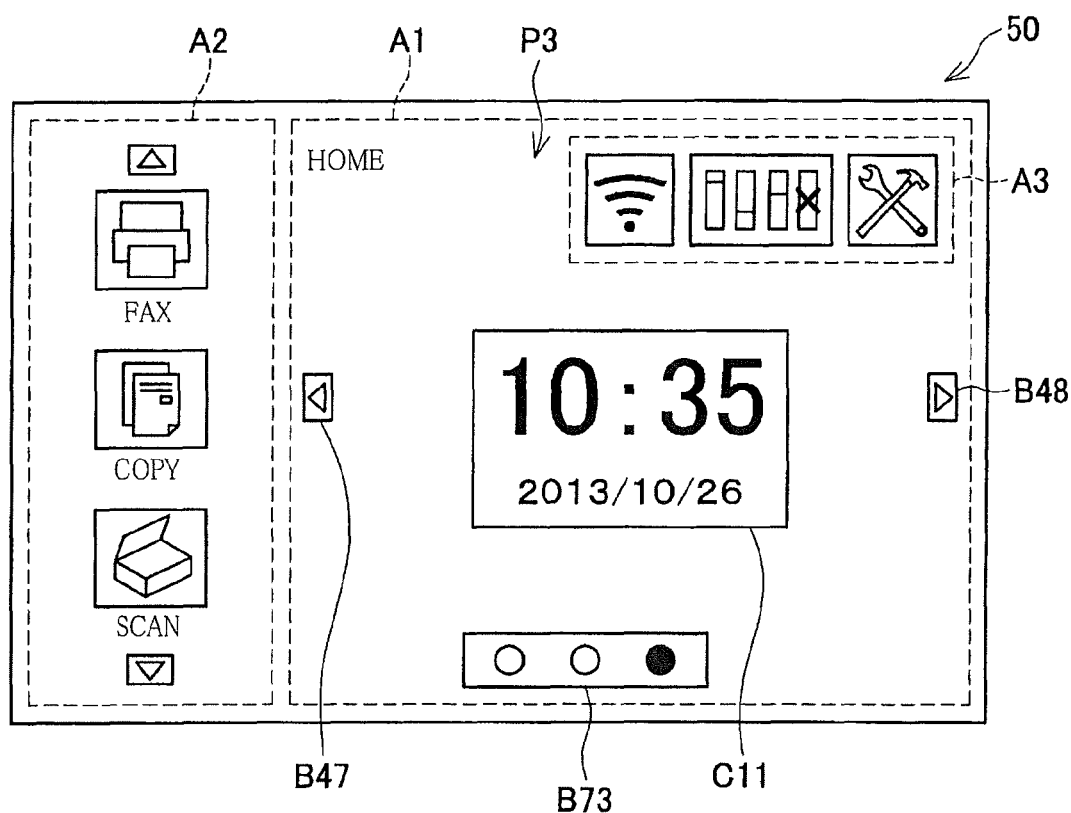
FIG. 9 is a display example (II) of the panel.

FIGS. 7-9 show display examples of images displayed on the panel 50. The display area of the panel 50 includes the first area A1, a second area A2, and a third area A3. In the first through third areas A1-A3, various images are displayed utilizing an Application Program Interface (API) of the basic function program 18.

There will be explained an image displayed in the first area A1. In the first area A1, a hierarchy image having a hierarchical structure which includes the uppermost-level images and lower-level images is displayed. As described above, a plurality of uppermost-level images exist. There is an instance in which second button images are displayed in some of the uppermost-level images. By each second button image, there is displayed, in the first area A1, a lower-level image corresponding to a function of the MFP 10 different from a function to which a lower-level image corresponding to each first button image (which will be explained) corresponds.

The lower-level images are images corresponding to a lower level in the hierarchical structure lower than the uppermost-level images. Examples of the lower-level images include: images for displaying information for setting parameters for utilizing various functions of the MFP 10 (such as the facsimile function, the copying function, and the scanning function); and images for displaying information for executing various functions of the MFP 10 according to the parameters.

Examples of the uppermost-level images are explained. There will be explained an instance in which the three uppermost-level images exist, i.e., the function display image P1, the shortcut image P2, and the home image P3. In this instance, the three uppermost-level images, i.e., the function display image P1 through the home image P3, are treated as a consecutive one row. In the following explanation, an order in the row is referred to as an ordinal number. More specifically, the function display image P1 which is the top in the row has the first ordinal number, the shortcut image P2 which is the second in the row has the second ordinal number, and the home image P3 which is the third in the row has the third ordinal number.

FIG. 7 shows the function display image P1 as the first example of the uppermost-level images. In the function display image P1 as a first uppermost-level image, there are displayed, each as the second button image, a "PHOTO" button B21, a "CLOUD" button B22, and an "A3 COPY" button B23. There are further displayed a left arrow button B43, a right arrow button B44, and an uppermost-level-image display-state image B71. The "PHOTO" button B21 is for displaying, in the first area Al, a lower-level image for printing an image taken by a digital camera. The "CLOUD" button B22 is for displaying, in the first area A1, a lower-level image for operating the MFP 10 by utilizing data stored on the Internet. The "A3 COPY" button B23 is for displaying, in the first area A1, a lower-level image (e.g., a copy execution image P4 shown in FIG. 10) for permitting the MFP 10 to perform a copying operation using A3-size paper. The left arrow button B43 and the right arrow button B44 are for changing or switching the uppermost-level images. In the uppermost-level-image display-state image B71, the leftmost one of three circles which are arranged in one row along the left-right direction in FIG. 7 is highlighted, namely, displayed in dense color. This indicates that the uppermost-level image having the first ordinal number, i.e., the function display image P1, is being currently displayed in the first area A1.

FIG. 8 shows the shortcut image P2 as the second example of the uppermost-level images. The shortcut image P2 as a second uppermost-level image is for displaying plurality of shortcut-button images. In the shortcut image P2, there are displayed shortcut buttons by each of which is displayed a lower-level image corresponding to a function to be executed according to the first button image or the second button image. In other words, there are displayed, in the shortcut image P2, shortcut buttons by each of which is displayed a lower-level image corresponding to a function to be executed according to parameters which are set according to at least one of: the lower-level image to be displayed by the first button image; and the lower-level image to be displayed by the second button image. In the shortcut image P2 shown in FIG. 8, there are displayed shortcut buttons B31-B34 each as a third button image, a shortcut create button B35, a left arrow button B45, a right arrow button B46, and an uppermost-level-image display-state image B72. The shortcut button B31 is for utilizing an SNS (Social Networking Service). The shortcut button B32 is for getting access to image data stored on the Internet. The shortcut button B33 is for printing a plurality of images on one print sheet. The shortcut button B34 is for performing duplex printing. The shortcut create button B35 relates to addition of shortcut buttons. More specifically, a new shortcut button can be displayed in the shortcut image P2 by user's touching on a button image of the shortcut create button B35. The left arrow button B45 and the right arrow button B46 are for changing or switching the uppermost-level images. In the uppermost-level-image display-state image B72, a central one of the three circles which are arranged in one row along the left-right direction in FIG. 8 is highlighted, namely, displayed in dense color. This indicates that the uppermost-level image having the second ordinal number, i.e., the shortcut image P2, is being currently displayed in the first area A1.

FIG. 9 shows the home image P3 as the third example of the uppermost-level images. The home image P3 as a third uppermost-level image is for displaying various contents information on the panel 50. Examples of the contents information include a clock, a slide show, etc. In the home image P3 shown in FIG. 9, there are displayed a clock C11, a left arrow button B47, a right arrow button B48, and an uppermost-level-image display-state image B73. In the uppermost-level-image display-state image B73, a rightmost one of the three circles which are arranged in one row along the left-right direction in FIG. 9 is highlighted, namely, displayed in dense color. This indicates that the uppermost-level image having the third ordinal number, i.e., the home image P3, is being currently displayed in the first area A1.

Figure 10:
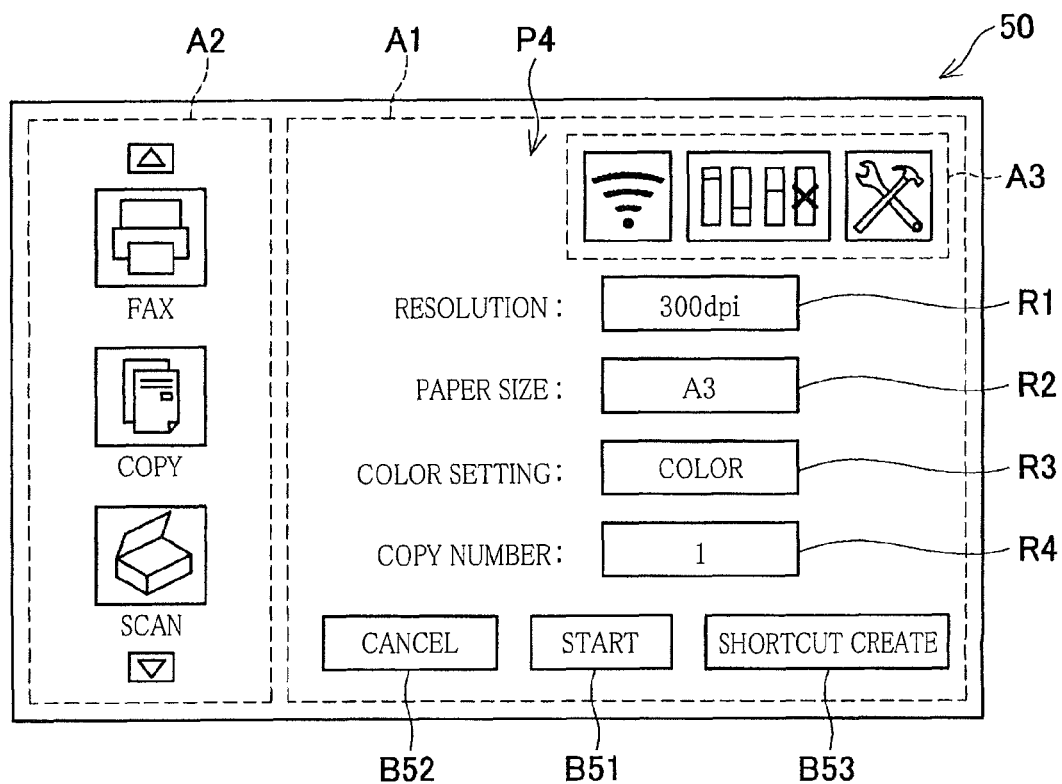
FIG. 10 is a display example (IV) of the panel.

One example of the lower-level image will be explained with reference to FIG. 10. FIG. 10 shows the copy execution image P4 as one example of the lower-level image. The copy execution image P4 is for setting parameters relating to the copying function of the MFP 10. The copy execution image P4 is an image which is next below the uppermost-level images (the function display image P1-the home image P3). In respective setting items R1-R4 of the copy execution image P4, the following setting items are displayed: resolution 211, paper size 212, color setting 213, and copy number 214. In the copy execution image P4, there are further displayed a "START" button B51, a "CANCEL" button B52, and a "SHORTCUT CREATE" button B53. For each of other functions (such as the facsimile function and the scanning function) of the MFP 10, there is prepared a lower-level image similar to the copy execution image P4.

Since these lower-level images are similar to the copy execution image P4, a detailed explanation thereof is dispensed with.

There will be next explained images displayed in the second area A2. In the second area A2, a plurality of first button images are displayed. The first button images are for displaying lower-level images corresponding to main functions (such as the facsimile function, the copying function, the scanning function, and the printing function) of the MFP 10 among various functions of the MFP 10. The second area A2 is displayed at a specific position in the display area of the panel 50, in other words, the position of the second area A2 in the display area of the panel 50 is constant, irrespective of which image is being displayed in the first area A1.

Examples of the first button images displayed in the second area A2 are shown in FIG. 7. In FIG. 7, there are displayed, each as the first button image, a "FAX" button B11, a "COPY" button B12, and a "SCAN" button B13. An up arrow button B41 and a down arrow button B42 are further displayed. The "FAX" button B11 is for displaying, in the first area A1, an image corresponding to the facsimile function (i.e., a lower-level image including button images). The "COPY" button B12 is for displaying, in the first area A1, an image corresponding to the copying function (i.e., a lower-level image including button images, such as the copy execution image P4 shown in FIG. 10). The "SCAN" button B13 is for displaying, in the first area A1, an image corresponding to the scanning function (i.e., a lower-level image including button images). The up arrow button B41 and the down arrow button B42 are for changing or switching the first button images displayed in the second area A2. The "FAX" button B11, the "COPY" button B12, and the "SCAN" button B13 are displayed in the second area A2 so as to be arranged along the up-down direction of the panel 50 as a first arrangement direction.

There will be next explained images displayed in the third area A3. In the third area A3, at least one status-indicator image is displayed. The status-indicator image is an image relating to a status of the MFP 10. The third area A3 is defined outside an area in which the second button images are displayed and outside an area in which the shortcut-button images are displayed. The third area A3 is displayed at a specific position in the display area of the panel 50, in other words, the position of the third area A3 in the display area of the panel 50 is constant, irrespective of which image is being displayed in the first area A1.

In FIG. 7, there are displayed, in the third area A3, an ink-amount image B61, a setting button B62, and a wireless-LAN-status image B63, each as the status-indicator image. The ink-amount image B61 is for indicating remaining amounts of ink to be used in printing. The setting button B62 is for displaying, in the first area A1, a setting screen through which various settings of the MFP 10 is performed. The wireless-LAN-status image B63 is for indicating a wireless signal strength in wireless LAN communication using the wireless LAN transmitter/receiver 61.

<Operations of MFP 10 (I)>

With reference to the flow charts of FIGS. 2-6, operations of the MFP 10 will be explained. The flow shown in FIGS. 2-6 is initiated by turning-on of the MFP 10 and is kept executed until the MFP 10 is turned off.

Figure 2:
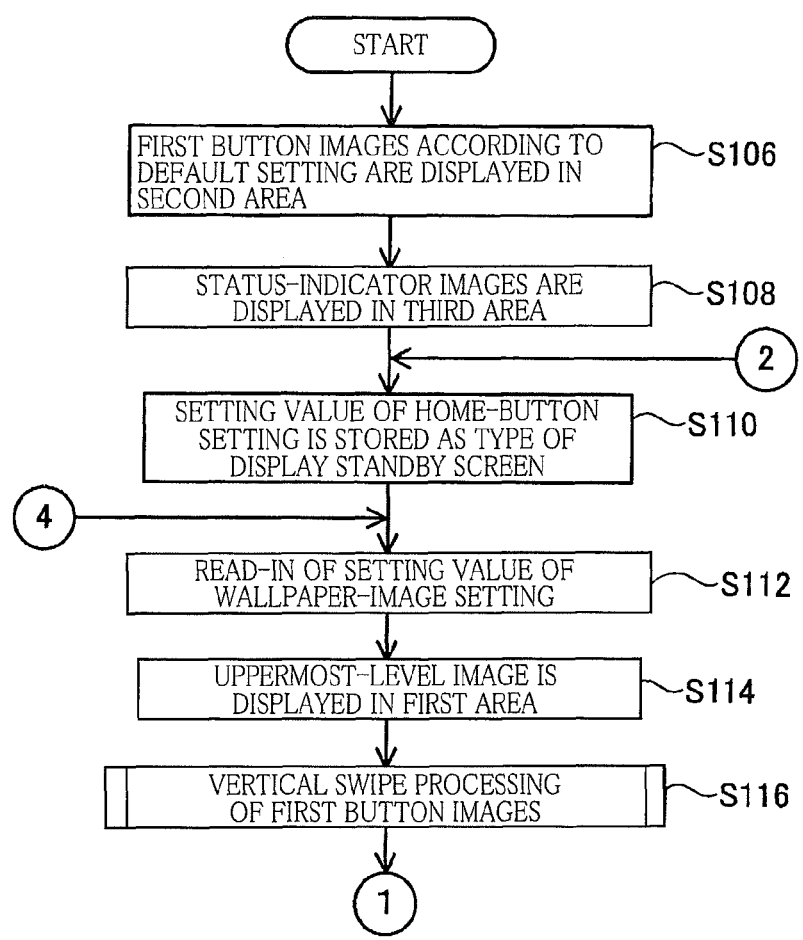
FIG. 2 is a flow chart (I) showing operations of the MFP.

The flow shown in FIG. 2 will be explained. In S106, the CPU 14 displays, in the second area A2, the first button images according to a default setting. The first button images according to the default setting may be set by a user or may be set by a manufacturer of the MFP 10. In FIG. 7, there are displayed, as the first button images according to the default setting, the "FAX" button B11, the "COPY" button B12, and the "SCAN" button B13.

In S108, the CPU 14 displays, in the third area A3, the status-indicator images. In FIG. 7, there are displayed in the third area A3, the ink-amount image B61, the setting button B62, and the wireless-LAN-status image B63, each as the status-indicator image.

In S110, the CPU 14 reads in a setting value of "home-button setting" from the NVRAM 40 and permits the read setting value to be stored in the RAM 30 as a type of display standby screen. In S112, the CPU 14 reads in a setting value of the wallpaper-image setting from the NVRAM 40 on the basis of the stored type of display standby screen. In S114, the CPU 14 displays, in the first area A1, one of the function display image P1, the shortcut image P2, and the home image P3 as a standby screen on the basis of the setting value of the wallpaper-image setting. In FIG. 7, the function display image P1 is displayed as the standby screen.

<Vertical Swipe Processing of First Button Images>

Figure 6:
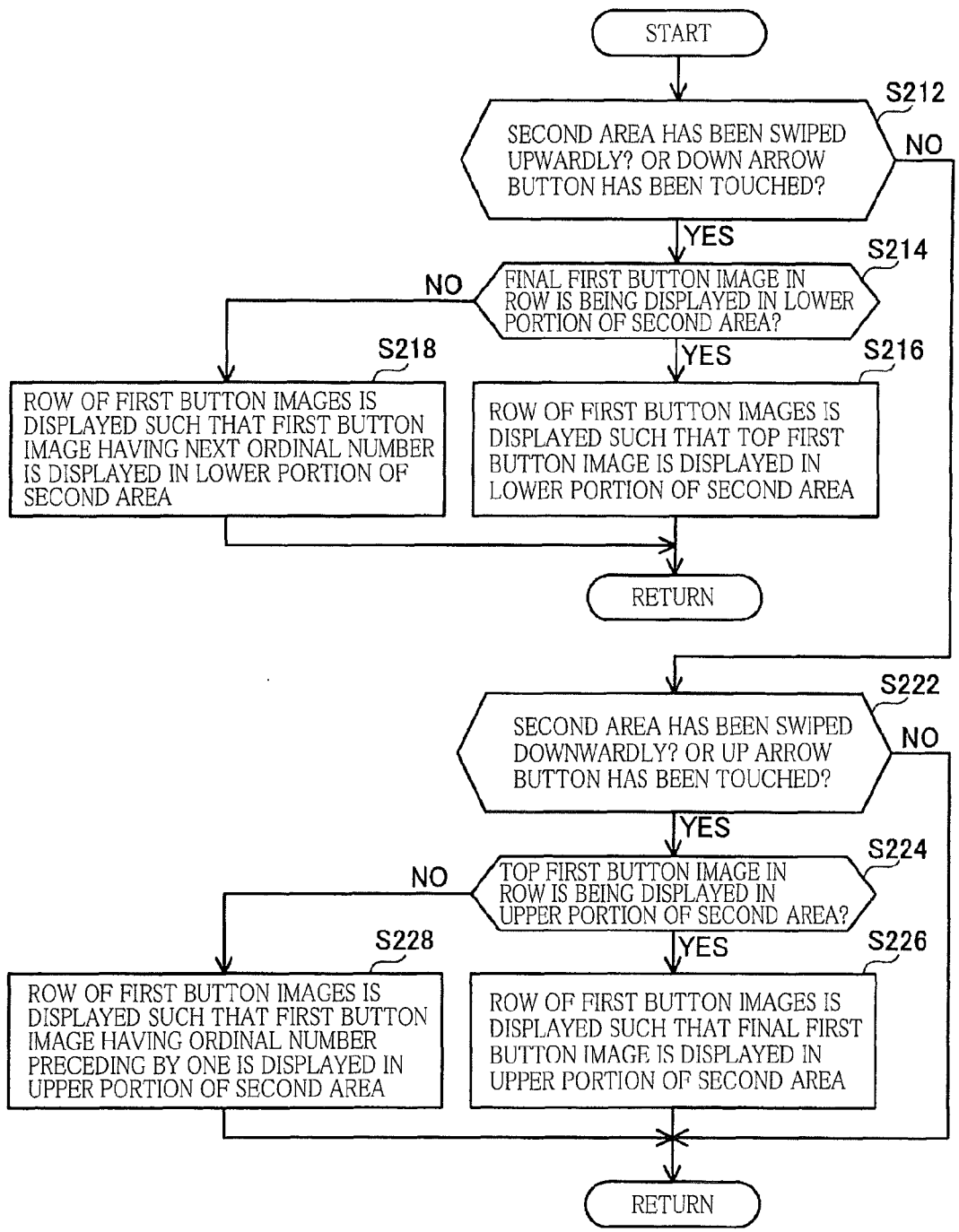
FIG. 6 is a flow chart (V) showing operations of the MFP.

In S116, the CPU 14 executes vertical swipe processing of the first button images. Here, "swipe" means a motion in which the user touches any position on the panel 50 and moves the touch point so as to sweep the touch point in a prescribed direction, and "vertical swipe" means a motion in which the user touches any position on the panel 50 and moves the touch point so as to sweep the touch point in the up-down direction of the panel 50 (i.e., in the up-down direction in the display example shown in FIG. 7). With reference to FIG. 6, the vertical swipe processing of the first button images will be explained taking, as an example, a case in which there exist four buttons each as the first button image, i.e., the "FAX" button B11, the "COPY" button B12, the "SCAN" button B13, a "PRINT" button B14 (not shown). Those four buttons, i.e., the "FAX" button B11—the "PRINT" button B14, are treated as one consecutive row, and an order in the row is referred to as an ordinal number. In the row, the "FAX" button B11 is the top first button image which is at the top of the row, and the "PRINT" button B14 is the final first button image which is at the end of the row. More specifically, the "FAX" button B11 which is at the top in the row has the first ordinal number, the "COPY" button B12 which is the second in the row has the second ordinal number, the "SCAN" button B13 which is the third in the row has the third ordinal number, and the "PRINT" button B14 which is at the end in the row has the fourth ordinal number. In respective three portions of the second area A2, i.e., an upper portion, an intermediate portion, and a lower portion, three of the four first button image (the "FAX" button B11-the "PRINT" button B14) are displayed, as shown in FIG. 7. In the display example shown in FIG. 7, the "FAX" button B11 is displayed in the upper portion of the second area A2, the "COPY" button B12 is displayed in the intermediate portion, and the "SCAN" button B13 is displayed in the lower portion.

Figure 3:
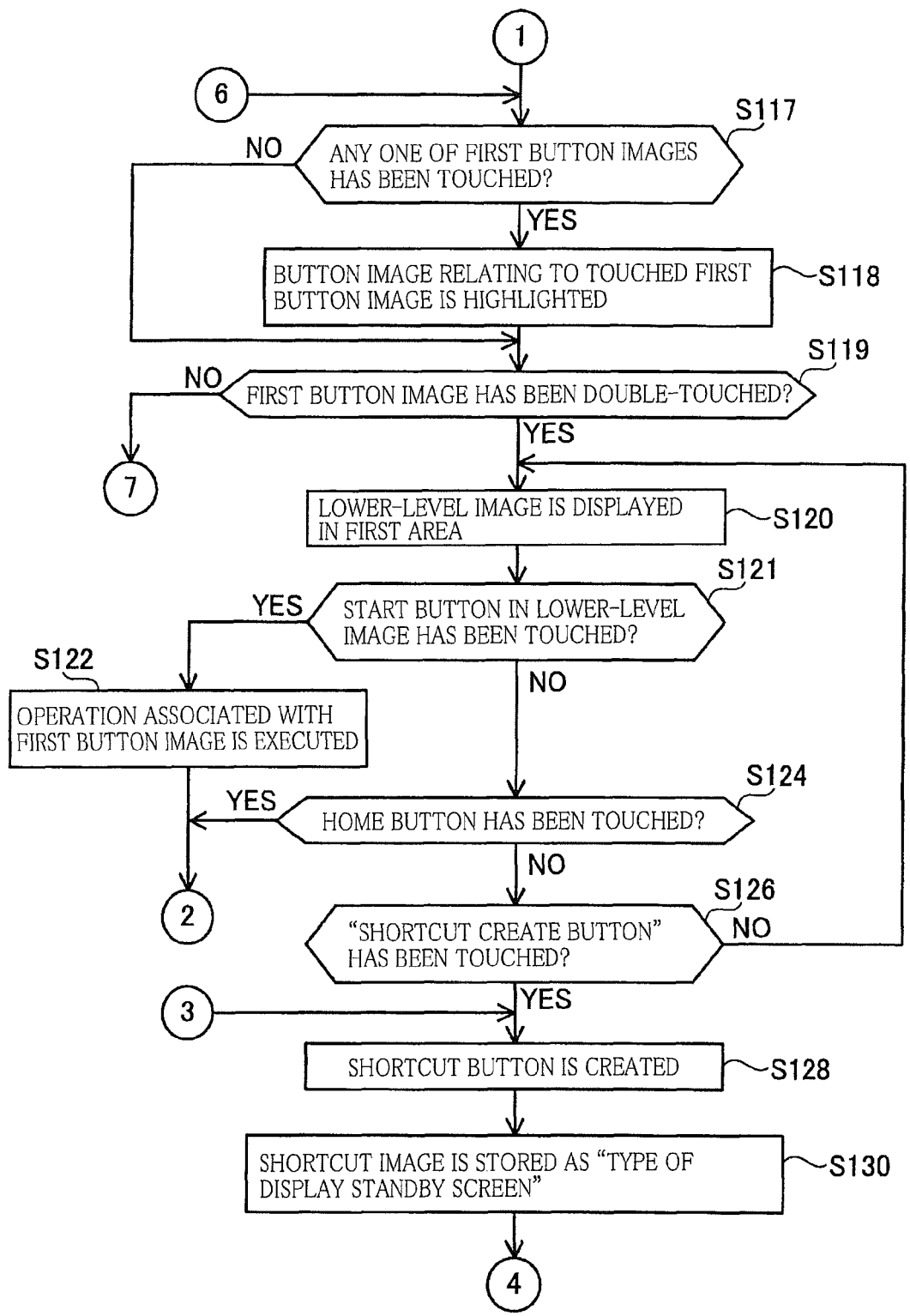
FIG. 3 is a flow chart (II) showing operations of the MFP.

In S212, the CPU 14 judges whether the second area A2 has been swiped in the upward direction (i.e., the upward direction in the display example shown in FIG. 7) within the display area of the panel 50 or the down arrow button B42 has been touched, namely whether upward swipe has been performed. A manner of judgment as to whether the upward swipe has been performed will be explained. The CPU 14 judges whether the coordinate detecting portion 51 has detected a directed coordinate in the second area A2 and whether the coordinate detecting portion 51 has detected a movement (dragging) of the detected coordinate. Where the movement of the directed coordinate has been detected, the CPU 14 judges whether a direction of the movement (hereinafter referred to as the "movement direction" where appropriate) of the directed coordinate coincides with the upward direction of the panel 50 (i.e., the upward direction in the display example shown in FIG. 7). Where the movement direction coincides with the upward direction, the CPU14 judges that the upward swipe has been performed.

Where the upward swipe has been performed or the down arrow button B42 has been touched (S212: YES), the flow goes to S214. In S214, the CPU 14 judges whether the first button image that is currently being displayed in the lower portion of the second area A2 is the final first button image which is at the end in the row (i.e., the "PRINT" button B14). Where the currently displayed first button image in the lower portion of the second area A2 is the final first button image which is at the end in the row (S214: YES), the flow goes to S216 in which the CPU 14 changes the first button images displayed in the second area A2 so as to be shifted, such that the top first button image which is the at the top of the row (i.e., the "FAX" button B11) is displayed in the lower portion of the second area A2, and the flow then goes to S117 (FIG. 3). On the other hand, where the currently displayed first button image in the lower portion of the second area A2 is not the final first button image in the row (S214: NO), the flow goes to S218 in which the CPU 14 changes the first button images displayed in the second area A2 so as to be shifted, such that the first button image, whose ordinal number is next to the ordinal number of the first button image that is currently being displayed in the lower portion of the second area A2, is displayed in the lower portion. The flow then goes to S117.

Where it is judged in S212 that the upward swipe has not been performed or the down arrow button B42 has not been touched (S212: NO), the flow goes to S222. In S222, the CPU 14 judges whether the second area A2 has been swiped in the downward direction (i.e., the downward direction in the display example shown in FIG. 7) within the display area of the panel 50 or the up arrow button B41 has been touched, namely whether downward swipe has been performed. A manner of judgment as to whether the downward swipe has been performed is similar to the above-described manner of judgment as to whether the upward swipe has been performed, and accordingly an explanation thereof is dispensed with. Where the downward swipe has been performed or the up arrow button B41 has been touched (S222: YES), the flow goes to S224. In S224, the CPU 14 judges whether the first button image that is currently being displayed in the upper portion of the second area A2 is the top first button image which is at the top of the row (i.e., the "FAX" button B11). Where the currently displayed first button image is the top first button image (S224: YES), the flow goes to S226 in which the CPU 14 changes the first button images displayed in the second area A2 so as to be shifted, such that the final first button image which is at the end of the row (i.e., the "PRINT" button B14) is displayed in the upper portion of the second area A2, and the flow then goes to S117. On the other hand, where the currently displayed first button image is not the top first button image (S224: NO), the flow goes to S228 in which the CPU 14 changes the first button images displayed in the second area A2 so as to be shifted, such that the first button image, whose ordinal number precedes, by one, the ordinal number of the first button image that is currently being displayed in the upper portion of the second area A2, is displayed in the upper portion. The flow then goes to S117.

<Operations of MFP 10 (II)>

In S117 (FIG. 3), the CPU 14 judges whether any one of the first button images displayed in the second area A2 has been touched. A manner of judgment will be explained with reference to the display example shown in FIG. 7. In the ROM 16, there are stored in advance coordinates which indicate a display area of each of the first button images (the "FAX" button B11-the "SCAN" button B13). The CPU 14 obtains a directed coordinate of a touch point on the coordinate detecting portion 51 according to the basic function program 18. Where the obtained directed coordinate is included in the coordinates that indicate the display area of any one of the "FAX" button B11-the "SCAN" button B13, it can be judged that the first button image whose display area includes the directed coordinate is being operated. Where the directed coordinate is not included in the display area of any of the first button images (S117: NO), the flow goes to S119. Where the directed coordinate is included in the display area of any one of the first button images (S117: YES), the flow goes to S118.

In S118, the CPU 14 highlights, among the button images displayed in the first area A1, a button image which relates to the first button image that has been touched in S117. A manner of highlighting includes enlarging the button image, displaying the button image in dense color, and flashing the button image. In the display example shown in FIG. 7, where the "COPY" button B 12 is touched, the "A3 COPY" button B23 relating to the "COPY" button B12 is highlighted.

In S 119, the CPU 14 judges whether any one of the first button images has been double-touched by the user, namely, whether the same button has been touched twice within a prescribed time by the user. Where any one of the first button images has been double-touched (S119: YES), the flow goes to S120. In S120, the CPU 14 displays, in the first area A, the lower-level image corresponding to the first button image which has been double-touched in S119, in place of the uppermost-level image. Further, the CPU 14 accepts inputting of parameter settings.

In the display example shown in FIG. 7, where the "COPY" button B12 has been double-touched (S119: YES), the copy execution image P4 (FIG. 10) corresponding to the "COPY" button B12 is displayed in the first area A1, in place of the function display image P1 (S120). Further, in the copy execution image P4 of FIG. 10, by touching any one of the setting items R1-R4, a plurality of setting candidates of the touched setting item are displayed. Where any one of the plurality of setting candidates has been touched, the touched setting candidate is stored as changed setting.

In S121, the CPU 14 judges whether a start button in the lower-level image has been touched. Where the start button has been touched (S121: YES), the flow goes to S122 in which the CPU 14 executes an operation associated with the first button image touched in S119. In the display example shown in FIG. 10, where the "START" button B51 has been touched, there is executed an operation associated with the first button image (the "COPY" button B12) touched in S119, namely, the copying operation. More specifically, the CPU 14 controls the scanning portion 56 to read a document and controls the printing portion 54 to execute printing on the basis of the read data, i.e., the copying operation.

On the other hand, where it is judged in S121 that the start button has not been touched (S121: NO), the flow goes to S124 in which the CPU 14 judges whether the home button B101 has been touched. Where it is judged that the home button B101 has been touched (S124: YES), the flow returns to S110. Where it is judged that the home button B101 has not been touched (S124: NO), the flow goes to S126.

In S126, the CPU 14 judges whether the "SHORTCUT CREATE" button has been touched. Where it is judged that the "SHORTCUT CREATE" button has not been touched (S126: NO), the flow returns to S120. Where it is judged that the "SHORTCUT CREATE" button has been touched (S126: YES), the flow goes to S128 in which the CPU 14 creates the shortcut button on the basis of the parameters of the lower-level image displayed in S120. In the display example shown in FIG. 10, where the "SHORTCUT CREATE" button B53 has been touched (S126: YES), the shortcut button is created on the basis of the parameters of the copy execution image P4 (the setting items R1-R4) (S128). The parameters are set according to the copy execution image P4.

In S130, the CPU 14 permits the shortcut image P2 to be stored in the RAM 30 as "the type of display standby screen", and the flow returns to S112. As a result, the shortcut image P2 to which the new shortcut button has been added by the processing in S128 is displayed in the first area A1 (S114).

Figure 4:
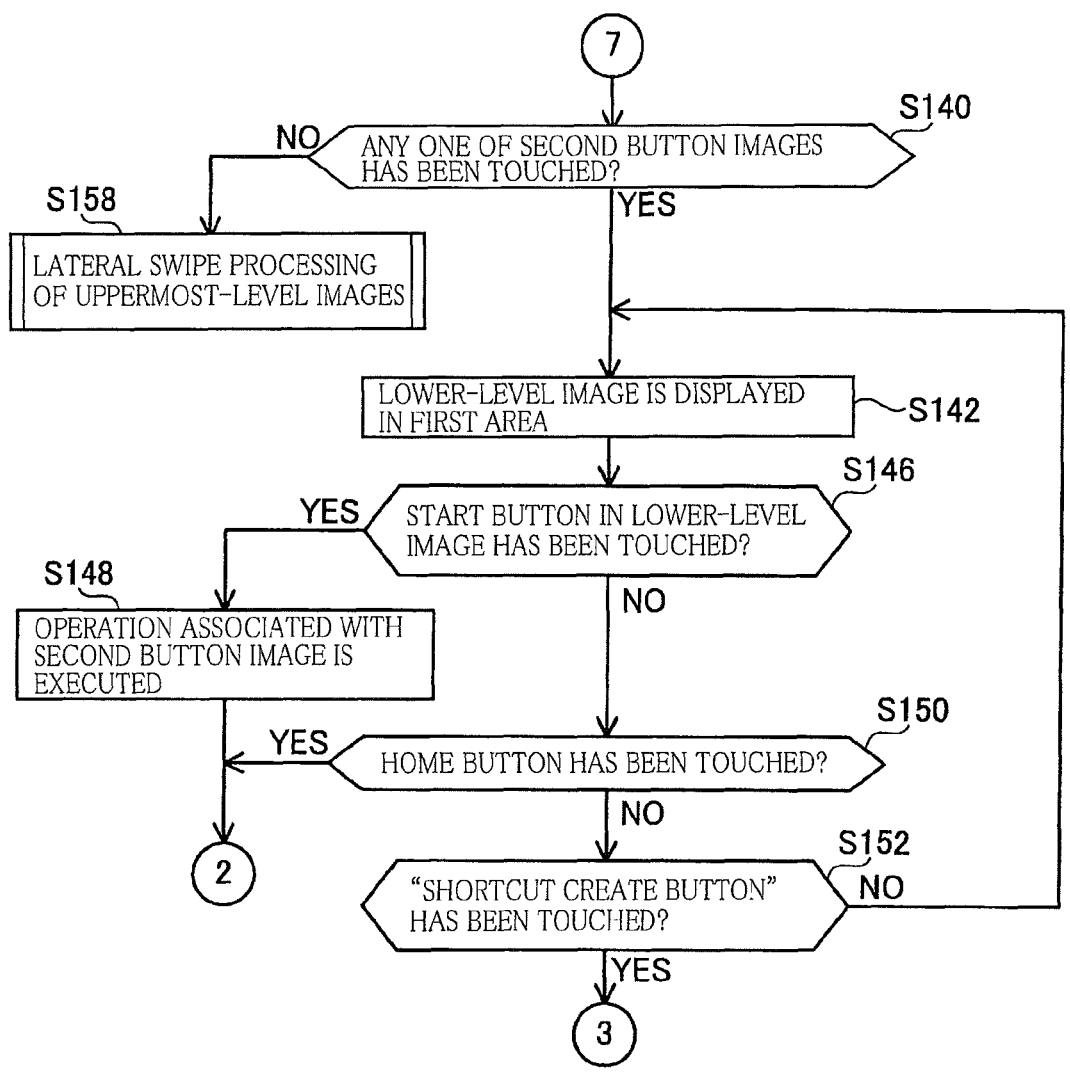
FIG. 4 is a flow chart (III) showing operations of the MFP.
Figure 5:
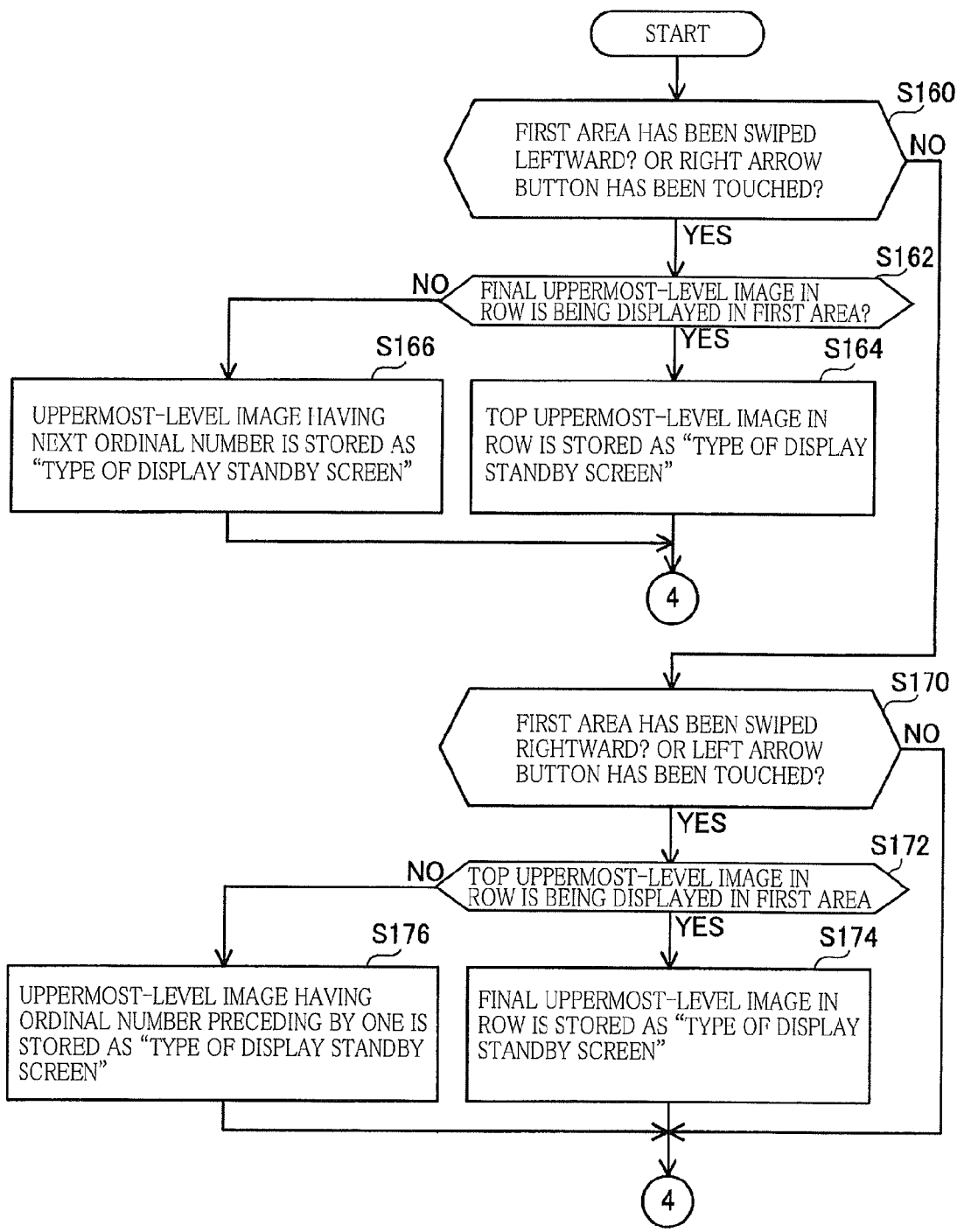
FIG. 5 is a flow chart (IV) showing operations of the MFP.

On the other hand, where the first button image has not been double-touched in S119 (S119: NO), the flow goes to S140 (FIG. 4). In S140, the CPU 14 judges whether any one of the second button images in the uppermost-level image displayed in the first area A1 has been touched. In the display example shown in FIG. 7, the CPU 14 judges whether any one of the second button images (the "PHOTO" button B21—the "A3 COPY" button B23) in the function display image P1 has been touched. Where it is judged that any one of the second button images has been touched (S140: YES), the flow goes to S142.

In S142, the CPU 14 displays, in the first area A1, the lower-level image corresponding to the second button image touched in S 140, in place of the uppermost-level image. Further, the CPU 14 accepts inputting of parameter settings. In the display example shown in FIG. 7, where the "A3 COPY" button B23 has been touched (S140: YES), the copy execution image P4 (FIG. 10) corresponding to the "A3 COPY" button B23 is displayed in the first area A1, in place of the function display image P1 (S142).

In S146, the CPU 14 judges whether the start button in the lower-level image has been touched. Where the start button has been touched (S146: YES), the flow goes to S148 in which the CPU 14 executes an operation associated with the second button image touched in S140. The flow then returns to S110 (FIG. 2). In the display example shown in FIG. 10, where the "START" button B51 has been touched, there is executed an operation associated with the second button image (i.e., the "A3 COPY" button B23) touched in S140, namely, the A3-copying operation.

On the other hand, where it is judged that the start button has not been touched (S146: NO), the flow goes to S150 in which the CPU 14 judges whether the home button B101 has been touched. Where the home button B101 has been touched (S150: YES), the flow returns to S110 (FIG. 2). Where the home button B101 has not been touched (S150: NO), the flow goes to 5152 in which the CPU 14 judges whether "SHORTCUT CREATE" button has been touched. Where the "SHORTCUT CREATE" button has not been touched (S152: NO), the flow returns to S142. Where the "SHORTCUT CREATE" button has been touched (S152: YES), the flow returns to S128.

<Lateral Swipe Processing of Uppermost-Level Images>

Where none of the second button images have not been touched in S140 (S140: NO), the flow goes to S158 to execute lateral swipe processing of the uppermost-level images. Here "lateral swipe" means a motion in which the user touches any position on the panel 50 and moves the touch point so as to sweep the touch point in the left-right direction of the panel 50 (i.e., in the left-right direction in the display example shown in FIG. 7). With reference to the flow chart of FIG. 5, the lateral swipe processing of the uppermost-level images executed in S158 will be explained taking, as an example, a case in which the three uppermost-level images (the function display image P1—the home image P3) are treated as one consecutive row, and an order in the row is referred to as an ordinal number. In the row, the function display image P1 is the top uppermost-level image which is at the top of the row, and the home image P3 is the final uppermost-level image which is at the end of the row. More specifically, the function display image P1 which is the uppermost-level image at the top in the row has the first ordinal number, the shortcut image P2 which is the second uppermost-level image in the row has the second ordinal number, and the home image P3 which is the third uppermost-level image in the row has the third ordinal number. In the display example shown in FIG. 7, the function display image P1 is displayed in the first area A1.

In S160, the CPU 14 judges whether the first area A1 has been swiped in the leftward direction (i.e., the leftward direction in the display example of FIG. 7) within the display area of the panel 50 or the right arrow button has been touched, namely, whether leftward swipe has been performed. A manner of judgment as to whether the leftward swipe has been performed is similar to the above-described manner of judgment as to whether the downward swipe has been performed, and accordingly an explanation thereof is dispensed with. Here, where the directed coordinate is detected in the second area A2 and a movement of the directed coordinate is detected, it is judged that the first area A1 has not been swiped (S160: NO, S170: NO).

Where the leftward swipe has been performed or the right arrow button has been touched (S160: YES) the flow goes to S162. In S162, the CPU 14 judges whether the uppermost-level image that is currently being displayed in the first area A1 is the final uppermost-level image which is at the end of the row (i.e., the home image P3). Where the currently displayed uppermost-level image in the first area A1 is the final uppermost-level image (S162: YES), the flow goes to S164. In S164, the CPU 14 permits the RAM 30 to store the top uppermost-level image (i.e., the function display image P1) as the "type of display standby screen". The flow then returns to S112 (FIG. 2). As a result, the top uppermost-level image (i.e., the function display image P1) is displayed in the first area A1 (S114).

On the other hand, where the currently displayed uppermost-level image in the first area A1 is not the final uppermost-level image which is at the end of the row (S162: NO), the flow goes to S166. In S166, the CPU 14 permits the RAM 30 to store, as the "type of display standby screen", the uppermost-level image whose ordinal number is next to the ordinal number of the currently displayed uppermost-level image in the first area A1. The flow then returns to S112 (FIG. 2). Thus, in the display example of FIG. 7, there is displayed, in the first area A1, the uppermost-level image (i.e., the shortcut image P2) whose ordinal number is next to the ordinal number of the currently displayed uppermost-level image (i.e., the function display image P1) in the first area A1 (S114).

Where it is judged in S160 that the leftward swipe has not been performed or the right arrow button has not been touched (S160: NO), the flow goes to S170. In S170, the CPU 14 judges whether the first area A1 has been swiped in the rightward direction (i.e., the rightward direction in the display example shown in FIG. 7) within the display area of the panel 50 or the left arrow button has been touched. Where the leftward swipe has been performed or the right arrow button has been touched (S170: YES), the flow goes to S172. In S172, the CPU 14 judges whether the uppermost-level image that is currently being displayed in the first area A1 is the top uppermost-level image which is at the top in the row (i.e., the function display image P1). Where the currently displayed uppermost-level image in the first area A1 is the top uppermost-level image (S172: YES), the flow goes to S174 in which the CPU 14 permits the RAM 30 to store the final uppermost-level image which is at the end of the row as the "type of display standby screen". The flow then returns to S112 (FIG. 2). As a result, the final uppermost-level image (i.e., the home image P3) is displayed in the first area A1 (S114).

On the other hand, where the currently displayed uppermost-level image in the first area A1 is not the top uppermost-level image (S172: NO), the flow goes to S176. In S176, the CPU 14 permits the RAM 30 to store the uppermost-level image whose ordinal number precedes, by one, the ordinal number of the currently displayed uppermost-level image in the first area A1, as the "type of display standby screen". The flow then returns to S112 (FIG. 2). As a result, in the display example shown in FIG. 8, there is displayed, in the first area A1, the uppermost-level image (i.e., the function display image P1) whose ordinal number precedes, by one, the ordinal number of the currently displayed uppermost-level image (i.e., the shortcut image P2) in the first area A1 (S114).

<Advantageous Effects>

Advantageous effects of the MFP 10 according to the illustrated embodiment will be explained. In the present MFP 10, any one of the plurality of uppermost-level images (the function display image P1—the home image P3) can be changeably displayed in the first area Al, thereby increasing the number of the uppermost-level images in the hierarchy image having the hierarchical structure. Accordingly, it is possible to avoid a situation in which the hierarchical structure becomes deeper than necessary, namely, the hierarchical structure has a larger number of levels than necessary. Therefore, it is possible to decrease the number of operations required for displaying, in the display screen, a function which the user desires to select, resulting in enhancement of user's convenience.

In the present MFP 10, the plurality of uppermost-level images include: the function display image P1 which includes the second button images by each of which is displayed the lower-level image corresponding to a function of the MFP 10 different from a function to which the lowermost-level image to be displayed by each of the first button images corresponds; the shortcut image P2 which includes the third buttons by each of which is displayed a lower-level image corresponding to a function to be executed according to parameters which are set according to the lower-level image to be displayed by each of the first button images and/or each of the second button images; and the home image P3 in which is displayed various contents information. Where the user sets the image that is the most suitable to his/her needs as the uppermost-level image, the user can easily access to information corresponding to the button. Thus, the present MFP 10 ensures enhancement of user's convenience.

In the present MFP 10, the first button images (the "FAX" button B11—the "SCAN" button B13) can be displayed in the second area A2 and the status-indicator images (the ink-amount image B61, the setting button B62, and the wireless-LAN-status image B63) can be displayed in the third area A3, irrespective of which image is being displayed in the first area A1. Accordingly, the first button images and the status-indicator images can be resident or always displayed in the panel 50, thereby enabling user's convenience to be enhanced.

In the present MFP 10, the position of each of the first button images (the "FAX" button B11-the "SCAN" button B13) within the second area A2 can be made constant and the position of each of the status-indicator images (the ink-amount image B61, the setting button B62, the wireless-LAN-status image B63) within the third area A3 can be made constant, irrespective of which image is being displayed in the first area A1. Accordingly, the position of each first button image and the position of each status-indicator image can be easily recognized by the user.

In the present MFP 10, the uppermost-level image can be switched or changed when the user touches any position within the first area A1 and moves the touch point so as to sweep or swipe the touch point in the left-right direction of the panel 50 as a first prescribed direction (i.e., the left-right direction in the display example of FIG. 7), namely, when left-right (lateral) swipe is performed. Further, the first button images (the "FAX" button B11-the "PRINT" button B14) displayed in the second area A2 can be switched or changed when the user touches any position within the second area A2 and moves the touch point so as to sweep or swipe the touch point in the up-down direction of the panel 50 as a second prescribed direction, namely, when up-down (vertical) swipe is performed. Accordingly, the uppermost-level image can be switched or changed by intuitive operations, thereby enhancing user's convenience. Further, since the swipe direction for switching the uppermost-level image (the left-right direction of the panel 50) and the swipe direction for changing the first button images (the up-down direction of the panel 50) are orthogonal to each other, it is possible to avoid an occurrence of misoperation in the switching operation of the uppermost-level image and the switching operation of the first button images.

In the present MFP 10, the status-indicator images (the ink-amount image B61, the setting button B62, the wireless-LAN-status image B63) are displayed so as to be arranged in the third area A3 along the left-right direction of the panel 50 as a second arrangement direction. Accordingly, when the user moves the touch point in the left-right direction of the panel 50 for switching the uppermost-level image, it is possible to prevent a trace of the movement of the touch point intersects the status-indicator images. It is therefore possible to prevent the touch point from moving into the display area of the status-indicator images in switching the uppermost-level image, thereby avoiding an occurrence of misoperation of the MFP 10. In an instance where the switching operation of the uppermost-level images is repeated many times, a detecting element (e.g., the transparent flat layer) of the coordinate detecting portion 51 may be deteriorated along the trace of the movement of the touch point. In the present MFP 10, however, the trace of the movement of the touch point is prevented from intersecting the status-indicator images. Hence, the detecting element of the coordinate detecting portion 51 in the area (the third area A3) in which the status-indicator images are displayed can be prevented from being deteriorated.

In the present MFP 10, it can be judged that the first area A1 is not swiped (S160: NO, S170: NO) when the user has touched any position in the second area A2 and has moved the touch point. Accordingly, it is possible to avoid misoperation in the switching operation of the uppermost-level images.

In the present MFP 10, the first button images displayed in the second area A2 can be switched when the user has touched any position in the second area A2 and moves the touch point so as to sweep or swipe the touch point in the up-down direction of the panel 50. Accordingly, the first button images can be switched or changed by intuitive operations, thereby enhancing user's convenience.

In the present MFP 10, the third area A3 in which the status-indicator images (the ink-amount image B61, the setting button B62, the wireless-LAN-status image B63) are displayed is located outside the area in which the second button images (the "PHOTO" button B21—the "A3 COPY" button B23) are displayed and outside the area in which the shortcut-button images (the shortcut buttons B31-B34) are displayed. The arrangement prevents the user from erroneously selecting the status-indicator images when the user touches any one of the second button images or any one of the shortcut-button images for selection. In an instance where the operation for selecting any one of the second button image or the operation for selecting any one of the third button image is repeated many times, the detecting element of the coordinate detecting portion 51 corresponding to the areas of the second button images and the third button images may be deteriorated. In the present MFP 10, however, it is possible to prevent deterioration of the detecting element of the coordinate detecting portion 51 corresponding to the third area A3 in which the status-indicator images are displayed.

The technological elements described in the present specification or the drawings exhibit technological utility individually or in various combinations, and are not limited to the combinations disclosed in claims at the time of filing of the application. Furthermore, the technology illustrated in the present specification or the drawings may simultaneously achieve a plurality of objects and has technological utility even where the technology achieves only one of these objects. Hereinafter, modified embodiments are explained.

<Modified Embodiments>

The number of the uppermost-level images is not limited to three, but may be two or less, or may be four or more. For example, the shortcut image P2 may exist in a plural number. In this instance, five uppermost-level images may be treated as one consecutive row such that the function display image P1 has the first ordinal number, a first shortcut image P2a has the second ordinal number, a second shortcut image P2b has the third ordinal number, a third shortcut image P2c has the fourth ordinal number, and the home image P3 has the fifth ordinal number. Also in this instance, the uppermost-level image displayed in the first area A1 can be switched or changed by the swipe processing with respect to the first area A1 or the touching of the right arrow button or the left arrow button.

The button image may be highlighted in S118 in a variety of ways. For instance, the button images relating to the first button image touched in S117 may be extracted from the plurality of second button images and the plurality of shortcut-button images. In this instance, there may be formed an image in which all of the extracted button images are displayed in list form, and the formed image may be displayed in the first area A1.

Where the directed coordinate is not included in any of the display areas of the first button images in S117 (S117: NO), the flow may go to S140 (FIG. 4). The CPU 14 may judge in S119 whether the first button image which had been once touched in S117 has been again touched by the user, and the control flow may go to S120 where the first button image has been again touched (S119: YES). In S120, the CPU 14 may display, in the first area A1, the lower-level image corresponding to the first button image which has been again touched in S119.

The direction in which the first button images (the "FAX" button B11—the "SCAN" button B13) are arranged, the direction in which the second button images (the "PHOTO" button B21—the "A3 COPY" button B23) are arranged, and the direction in which the shortcut buttons B31-B34 are arranged, are not limited to those in the illustrated embodiment. For instance, the second area A2 may have a rectangular shape whose long side is parallel to the left-right direction of the panel 50, and the first button images (the "FAX" button B11—the "SCAN" button B13) may be displayed so as to be arranged in the second area A2 along the left-right direction of the panel 50. This arrangement prevents an occurrence of a situation in which the trace of the movement of the touch point intersects the second button images when the user swipes the first area A1 in the left-right direction of the panel 50, thereby preventing misoperation of the MFP 10.

The status-indicator images displayed in the third area A3 are not limited to the ink-amount image B61, the setting button B62, and the wireless-LAN-status image B63. Any image may be displayed in the third area A3 as long as the images relate to the status of the MFP 10. The lower-level images corresponding to the second button images (the "PHOTO" button B21—the "A3 COPY" button B23) are not limited to the copy execution image P4 (FIG. 10), but may be various sorts of lower-level images.

The number of the second button images displayed in the function display image P1 and the number of the first button images (the "FAX" button B11—the "SCAN" button B13) displayed in the second area A2 are not limited to three. Even where the numbers are two or less, or four or more, the advantages of the invention can be ensured.

In the illustrated embodiment, the first button images (the "FAX" button B11—the "SCAN" button B13) are displayed in the second area A2, and the status-indicator images (the ink-amount image B61, the setting button B62, the wireless-LAN-status image B63) are displayed in the third area A3, irrespective of which image is being displayed in the first area A1. The manner of the thus displaying the first button images and the status-indicator images may take wide variety of forms. For instance, the first button images and the status-indicator images may continue to be displayed before and after the image that is being displayed in the first area A1 is switched. Alternatively, when the image that is being displayed in the first area A1 is switched, the first button images and the status-indicator images may be once cleared and may be thereafter restored or re-displayed.

The technological features of the present invention relate to the displaying manner of the panel 50. Therefore, the application range of the technology of the present invention is not limited to the MFP 10, but may include various devices having a display screen, such as cellular phones and notebook computers.

Various information stored in the ROM 16 and the NVRAM 40 may be stored in an external storage device. In this instance, various processing may be executed such that the information is be read out from the external storage device and once stored in the RAM 3. Examples of the external storage device include memory cards and external hard disk.

The panel 50 is one example of a display device. The coordinate detecting portion 51 is one example of a coordinate detecting portion. The MFP 10 is one example of an image forming apparatus. A portion of the CPU 14 to execute S114 is one example of a first display control section. Each of the "FAX" button B11, the "COPY" button B 12, the "SCAN" button B13, and the "PRINT" button B14 is one example of a first button image. A portion of the CPU 14 to execute S106 is one example of a second display control section. A portion of the CPU 14 to execute S142 is one example of a third display control section. Each of the "PHOTO" button B21, the "CLOUD" button B22, and the "A3 COPY" button B23 is one example of a second button image. The function display image P1 is one example of a first uppermost-level image. Each of the shortcut buttons B31-B34 is one example of a third button image. The shortcut image P2 is one example of a second uppermost-level image. The clock C11 is one example of contents information. The home image P3 is one example of a third uppermost-level image. Each of the ink-amount image B61, the setting button B62, and the wireless-LAN-status image B63 is one example of a status-indicator image. A portion of the CPU 14 to execute S108 is one example of a fourth display control section. The left-right direction of the panel 50 is one example of a first prescribed direction. The up-down direction of the panel 50 is one example of a first arrangement direction. The left-right direction of the panel 50 is one example of a second arrangement direction. The up-down direction of the panel 50 is one example of a second prescribed direction.

What is claimed is:

1. An image forming apparatus, comprising: an image forming device configured to form an image; a display device configured to display various images in a display area and having a touch panel configured to accept an input to the display area by an input tool, the input representing a command input including at least one of a touch by the input tool on the display area and a movement of the input tool that keeps touching on the display area;

and a controller, the image forming apparatus configured to provide a plurality of functions by use of the image forming device, wherein the controller is configured to control the display device to display, in a first area in the display area of the display device, a plurality of first-function images respectively corresponding to a plurality of first functions including a function of printing images taken by a camera, wherein the controller is configured to control the display device to display, in a second area in the display area of the display device, a plurality of second-function images respectively corresponding to a plurality of second functions including a facsimile function, a copying function, and a scanning function, wherein the controller is configured to change the first-function images and not to change the second-function images, in response to acceptance by the touch panel of a command input to the first area that commands changing of the first-function images in a state in which the second-function images and the first-function images are being displayed by the display device, the command input being one of: a touch by the input tool on an area in which a first-direction image is being displayed in the first area, the first-direction image suggesting the changing and corresponding to a first direction along which the first-function images are arranged; and a movement of the input tool in the first direction that keeps touching on the first area, wherein the controller is configured such that, in response to acceptance by the touch panel of a command input that the input tool touches one of the second-function images, the controller controls the display device to display a screen for providing one of the second functions corresponding to the one of the second-function images touched by the input tool, and wherein the controller is configured such that, in response to acceptance by the touch panel of a command input that the input tool touches one of the first-function images, the controller controls the display device to display a screen for providing one of the first functions corresponding to the one of the first-function images touched by the input tool.

2. The image forming apparatus according to claim 1, wherein the controller is configured to control the display device to display, in a third area in the display area of the display device, at least one status-indicator image relating to a status of the image forming apparatus, and wherein the controller is configured to display the at least one status-indicator image in the third area even after any of the first-function images are displayed in the first area as a result of the changing of the first-function images in response to acceptance by the touch panel of the command input to the first area that commands changing of the first-function images.

3. The image forming apparatus according to claim 2, wherein, after changing the first-function images displayed in the first area in response to acceptance by the touch panel of the command input to the first area that commands changing of the first-function images, the controller is configured to control the display device to display the second-function images at the same position in the display area of the display device before and after the changing and is configured to control the display device to display the at least one status-indicator image at the same position in the display area of the display device before and after the changing.

4. The image forming apparatus according to claim 3, wherein at least one of the plurality of second functions and at least one of the plurality of first functions are functions to be provided by consumption of mutually the same consumables, and wherein the controller is configured to control the display device to display, in the third area, the at least one status-indicator image relating to a status of the consumables, even after any of the first-function images are displayed in the first area as a result of the changing of the first-function images.

5. The image forming apparatus according to claim 3, wherein at least one of the plurality of second functions and at least one of the plurality of first functions are functions to be provided by use of wireless LAN, and wherein the controller is configured to control the display device to display, in the third area, the at least one status-indicator image relating to a status of the wireless LAN, even after any of the first-function images are displayed in the first area as a result of the changing of the first-function images.

6. The image forming apparatus according to claim 3, wherein the controller is configured to control the display device to display, in the third area, a setting image together with the at least one status-indicator image, the setting image relating to setting of parameters to be used in provision of the second functions and provision of the first functions, wherein the controller is configured to control the display device to display, in the third area, the setting image together with the at least one status-indicator image, even after any of the first-function images are displayed in the first area as a result of the changing of the first-function images, and wherein the controller is configured to control the display device to display a screen for setting the parameters, in response to acceptance by the touch panel of a command input that the input tool touches the setting image.

7. The image forming apparatus according to claim 1, wherein the controller is configured to execute processing of displaying the first-function images so as to be arranged along the first direction in the first area.

8. The image forming apparatus according to claim 7, wherein the plurality of first-function images are arranged according to an arrangement order, wherein the first direction is defined by a positive direction and a negative direction, the negative direction is the opposite direction of the positive direction, wherein the controller is configured to control the display device to display the first-function images so as to be directed in the positive direction along the first direction according to the arrangement order, wherein, in response to acceptance by the touch panel of a positive command input to the first area that commands changing of the first-function images, the controller is configured to change the first-function images and not to change the second-function images, wherein a first group of the first-function images are displayed after changing, the positive command designating the positive direction of the first direction in the state in which the second-function images and the first-function images are being displayed by the display device, and wherein in response to acceptance by the touch panel of a negative command input to the first area that commands changing of the first-function images, the controller is configured to change the first-function images and not to change the second-function images, wherein a second group of the first-function images are displayed after changing, the positive command designating the negative direction of the first direction in the state in which the second-function images and the first-function images are being displayed by the display device, the second group of the first-function images being different from the first group of the first-function images.

9. The image forming apparatus according to claim 8, wherein the controller is configured to change the first-function images, in response to acceptance by the touch panel of the first command input to the first area in a state in which the last first-function image that comes last in the arrangement order among the plurality of first-function images is being displayed by the display device, so that the last first-function image is not displayed and an initial first-function image that comes first in the arrangement order among the plurality of first-function images is displayed by the display device, and wherein the controller is configured to change the first-function images, in response to acceptance by the touch panel of the second command input to the first area in a state in which the initial first-function image is being displayed by the display device, so that the initial first-function image is not displayed and the last first-function image is displayed in the display device.

10. The image forming apparatus according to claim 1, wherein said one of the touch by the input tool on the area in which the first-direction image is being displayed in the first area and the movement of the input tool in the first direction that keeps touching on the first area is the touch by the input tool on the area in which the first-direction image is being displayed in the first area.

11. The image forming apparatus according to claim 1, wherein said one of the touch by the input tool on the area in which the first-direction image is being displayed in the first area and the movement of the input tool in the first direction that keeps touching on the first area is the movement of the input tool in the first direction that keeps touching on the first area.

12. The image forming apparatus according to claim 11, wherein the controller is configured to control the display device to display, in a third area in the display area of the display device, a plurality of status-indicator images relating to a status of the image forming apparatus, so as to be arranged along the first direction, and wherein the controller is configured to display the at least one status-indicator image in the third area even after any of the first-function images are displayed in the first area as a result of the changing of the first-function images in response to acceptance by the touch panel of the command input to the first area that commands changing of the first-function images.

13. The image forming apparatus according to claim 12, wherein the controller is configured to execute processing of displaying the plurality of status-indicator images so as to be arranged along the first direction at a position in the display area of the display device that does not align with the first-function images in the first direction.

14. The image forming apparatus according to claim 13, wherein the controller is configured to control the display device to display the second-function images such that a position of at least one of the second-function images is located at a positive position with respect to a position of at least one of the first-function images in a second direction orthogonal to the first direction and such that a position of at least one of the second-function images is located at a negative position with respect to a position of the third area in the second direction.

15. The image forming apparatus according to claim 11, wherein, in response to acceptance of a movement of the input tools in the first direction that keeps touching on the first area, the controller causes the first-function images to be changed where the touch on the display area is a touch on the first area and does not cause the first-function images to be changed where the touch on the display area is a touch on the second area.

16. The image forming apparatus according to claim 15, wherein the controller is configured to execute processing of displaying the second-function images so as to be arranged along a second direction in the second area, and wherein the controller is configured to change the second-function images and not to change the first-function images in response to acceptance of a movement of the input tool in the second direction that keeps touching on the first area.

17. The image forming apparatus according to claim 11, wherein, in response to acceptance of a movement of the input tools in the first direction that keeps touching on the first area, the controller causes the first-function images to be changed where the touch on the display area is a touch on the first area and does not cause the first-function images to be changed where the touch on the display area is a touch on the third area.

18. The image forming apparatus according to claim 1, wherein the controller is configured to control the display device to display the second-function images in the second area that is outside the first area in which the first-function images are being displayed even when any of the plurality of first-function images are being displayed.

19. The image forming apparatus according to claim 18, wherein the controller is configured to control the display device to display at least one of a status-indicator image in a third area that is outside the first area in which the first-function images are being displayed even when any of the plurality of first-function images are being displayed.

20. The image forming apparatus according to claim 1, wherein the plurality of first functions further include at least one of a function of using data stored on the Internet, a function of performing a function printing with predetermined setting, a function using SNS, a function of getting access to data stored on the Internet, and a function of printing a plurality of images on one sheet.

21. The image forming apparatus according to claim 1, wherein the controller is configured to change the plurality of first-function images altogether at one time.

22. A non-transitory computer-readable storage medium in which is stored a program to be executed by a computer of an image forming apparatus comprising: an image forming device configured to form an image; a display device configured to display various images in a display area and having a touch panel configured to accept an input to the display area by an input tool, the input representing at least one of a touch by the input tool on the display area and a movement of the input tool that keeps touching on the display area; and a controller, the image forming apparatus configured to provide a plurality of functions by use of the image forming device,
wherein the program permits the computer to function as the controller,
wherein the controller is configured to control the display device to display, in a first area in the display area of the display device, a plurality of first-function images respectively corresponding to a plurality of first functions including a function of printing images taken by a camera,
wherein the controller is configured to control the display device to display, in a second area in the display area of the display device, a plurality of second-function images respectively corresponding to a plurality of second functions including a facsimile function, a copying function, and a scanning function,
wherein the controller is configured to change the first-function images and not to change the second-function images, in response to acceptance by the touch panel of a command input to the first area that commands changing of the first-function images in a state in which the second-function images and the first-function images are being displayed by the display device, the command input being one of: a touch by the input tool on an area in which a first-direction image is being displayed in the first area, the first-direction image suggesting the changing and corresponding to a first direction along which the first-function images are arranged; and a movement of the input tool in the first direction that keeps touching on the first area, wherein the controller is configured such that, in response to acceptance by the touch panel of a command input that the input tool touches one of the second-function images, the controller controls the display device to display a screen for providing one of the second functions corresponding to the one of the second-function images touched by the input tool, and wherein the controller is configured such that, in response to acceptance by the touch panel of a command input that the input tool touches one of the first-function images, the controller controls the display device to display a screen for providing one of the first functions corresponding to the one of the first-function images touched by the input tool.

* * * * *